(12) United States Patent
Shimada

(10) Patent No.: US 6,453,228 B1
(45) Date of Patent: Sep. 17, 2002

(54) VEHICLE DRIVE FORCE CONTROL SYSTEM AND METHOD

(75) Inventor: Michihito Shimada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/938,655

(22) Filed: Aug. 27, 2001

(30) Foreign Application Priority Data

Aug. 30, 2000  (JP) ........................................ 2000-261243

(51) Int. Cl.[7] ................................................ G06F 7/00
(52) U.S. Cl. ........................... 701/89; 701/69; 180/197; 180/248
(58) Field of Search ............................. 701/89, 70, 71, 701/72, 73, 74, 80, 81, 69; 303/143, 190; 180/197, 248

(56) References Cited

U.S. PATENT DOCUMENTS 5,752,211 A  * 5/1998 Takasaki et al. ............... 701/69
5,826,209 A  * 10/1998 Matsuno ....................... 701/69

FOREIGN PATENT DOCUMENTS

| JP | 1-106734 | 4/1989 |
| JP | 2-133006 | 5/1990 |
| JP | 7-117512 | 5/1995 |

* cited by examiner

*Primary Examiner*—Yonel Beaulieu
(74) *Attorney, Agent, or Firm*—Oliff & Berridge, PLC

(57) ABSTRACT

A vehicle drive force control system reduces front-wheel drive force and rear-wheel drive force during unstable running of a vehicle. The front-wheel drive force is reduced with an increase in the running instability, and the front-wheel and rear-wheel drive forces are controlled during low-speed vehicle turning while traction control is effected for at least one of the front wheels. The result is that the front-wheel drive force can be reduced with a decrease in friction coefficient $\mu$ of a road surface, while the rear-wheel drive force can be reduced with an increase in turning angle of the vehicle and does not exceed the front-wheel drive force.

15 Claims, 6 Drawing Sheets

VEHICLE DRIVE FORCE CONTROL SYSTEM AND METHOD

INCORPORATION BY REFERENCE

The disclosure of Japanese Patent Application No. 2000-261243 filed on Aug. 30, 2000 including the specification, drawings and abstract is incorporated herein by reference in its entirety.

BACKGROUND OF THE INVENTION

1. Field of Invention

The present invention relates to a drive force control system for an automotive vehicle, and more particularly to a control system and method for controlling a drive force of an automotive vehicle having a front drive device for driving front wheels and a rear drive device for driving rear wheels.

2. Description of Related Art

JP-A-7-117512 discloses an example of a drive force control system for an automotive vehicle having a front drive device arranged to drive the front wheels of the vehicle, and a rear drive device arranged to drive the rear wheels. The drive force control system disclosed in this publication is adapted such that the rear-wheel drive torque to be produced by the rear drive device is increased by an amount corresponding to an amount of reduction of the front-wheel drive torque produced by the front drive device when the front-wheel drive torque is reduced in a traction control for the front drive wheels.

The vehicle drive force control system of the type described above prevents deterioration of the drivability and/or acceleration performance of the vehicle by increasing the rear-wheel drive torque by the amount corresponding to the amount of reduction of the front-wheel drive torque produced by the front drive device. This vehicle drive force control system is further arranged such that the rear-wheel drive torque produced by the rear drive device does not exceed the front-wheel drive torque produced by the front drive device. This arrangement is effective in preventing an oversteering behavior of the vehicle, and improves the straight-line acceleration stability of the vehicle.

In the known vehicle drive force control system described above, however, the front-wheel and rear-wheel drive forces are basically controlled so as to optimize the proportion of the front and rear-wheel drive forces depending upon the running condition of the vehicle, in substantially the same manner as in the conventional drive force control system for four-wheel-drive (4WD) vehicles. Namely, this vehicle drive force control system is not designed with enough considerations to assure optimum control of the front and rear-wheel drive forces during turning of the vehicle. Accordingly, further improvements are needed in this vehicle drive force control system to further optimize the control of the vehicle drive force during an unstable state of turning of the vehicle with a relatively large amount of lateral slipping of the wheels, or during traction control of the front wheels during turning of the vehicle.

SUMMARY OF THE INVENTION

It is therefore an object of this invention to improve the turning stability and drivability of the vehicle by further optimizing the control of the front-wheel and rear-wheel drive forces to be produced by the respective front and rear-wheel drive devices during turning of the vehicle.

This object may be achieved according to a first aspect of this invention, which provides a drive force control system for an automotive vehicle, having a front-wheel drive device for driving front wheels of the vehicle, a rear-wheel drive device for driving rear wheels of the vehicle, where one of the front-wheel and rear-wheel drive devices serving as a primary drive device of the vehicle while the other of the front-wheel and rear-wheel drive devices serving as an auxiliary drive device of the vehicle, and a drive-force controller operable when an amount of lateral slip of the wheels is larger than a predetermined threshold to reduce a drive force to be produced by the primary drive device, and to reduce a drive force to be produced by said auxiliary drive device by an amount irrespective of an amount of reduction of the drive force of said primary drive device.

In the vehicle drive force control system described above, the drive force of the auxiliary drive device may be reduced to zero.

This object may also be achieved according to a second aspect of this invention, which provides a drive force control system for an automotive vehicle, having a front-wheel drive device for driving front wheels of the vehicle, a rear-wheel drive device for driving rear wheels of the vehicle and a drive-force controller operable to reduce a drive force to be produced by the front-wheel drive device depending upon a slipping state of the front wheels being drive by the front-wheel drive device, and to reduce a drive force to be produced by the rear-wheel drive device depending upon an angle of turning of the vehicle.

In the vehicle drive force control system constructed according to the first aspect of this invention, the drive-force controller is operated when the vehicle is turning during low stability with a relatively large amount of lateral slip of the wheels. This operation allows the drive force produced by the primary drive device to be reduced while the drive force produced by the auxiliary drive device is reduced by an amount irrespective of the amount of reduction of the drive force of the primary drive device. Thus, the amount of reduction of the drive force of the auxiliary drive device can be controlled freely from the amount of reduction of the drive force of the primary drive device. Accordingly, this operation allows the present vehicle drive force control system to enable the vehicle operator to manipulate the braking system of the vehicle. The vehicle drive force control system can also adjust the vehicle running stability control apparatus of braking force control type to effectively decelerate the turning vehicle. Accordingly, the vehicle drive force control system is more effectively able to increase the vehicle turning stability than the known vehicle drive force control system.

In the vehicle drive force control system according to the second aspect of this invention, the drive-force controller is operated to reduce the drive force of the front-wheel drive device, depending upon the slipping state of the front wheels being driven by the front-wheel drive device, and to reduce a drive force of the rear-wheel drive device, depending upon the angle of turning of the vehicle. When the vehicle is turning while the front wheels being driven by the front-wheel drive device are slipping, the drive force of the rear wheels is reduced with an increase in the turning angle of the vehicle. This situation can sometimes increase the likelihood of deterioration of the turning stability of the vehicle. However, the vehicle drive force control system according to the second aspect of this invention prevents the deterioration of the turning stability of the vehicle due to an excessively large drive force of the rear wheels.

This object may also be achieved according to a third aspect of this invention, which provides a method of controlling a drive force of an automotive vehicle including a front-wheel drive device for driving front wheels of the vehicle, and a rear-wheel drive device for driving rear wheels of the vehicle, where one of the front-wheel and rear-wheel drive devices serves as a primary drive device of the vehicle, while the other of the front-wheel and rear-wheel drive devices serves as an auxiliary drive device of the vehicle. This method comprises the steps of detecting an amount of lateral slip of the wheels, reducing a drive force to be produced by the primary drive device when the amount of lateral slip of the wheels is larger than a predetermined threshold, and reducing a drive force to be produced by the auxiliary drive device by an amount irrespective of an amount of reduction of the drive force of the primary drive device when the amount of lateral slip is larger than the predetermined threshold.

The object indicated above may also be achieved according to a fourth aspect of this invention, which provides a method of controlling a drive force of an automotive vehicle that includes a front-wheel drive device for driving front wheels of the vehicle, and a rear-wheel drive device for driving rear wheels of the vehicle. This method comprises the steps of reducing a drive force to be produced by the front-wheel drive device, depending upon a slipping state of the front wheels being driven by the front-wheel drive device, and reducing a drive force to be produced by the rear-wheel drive device, depending upon an angle of turning of the vehicle.

BRIEF DESCRIPTION OF THE DRAWINGS

The above and other objects, features, advantages, and technical and industrial significance of this invention will be better understood by reading the following detailed description of a presently preferred exemplary embodiments of the invention, when considered in connection with the accompanying drawings, in which.

DETAILED DESCRIPTION OF PREFERRED EMBODIMENTS

Figure 1:
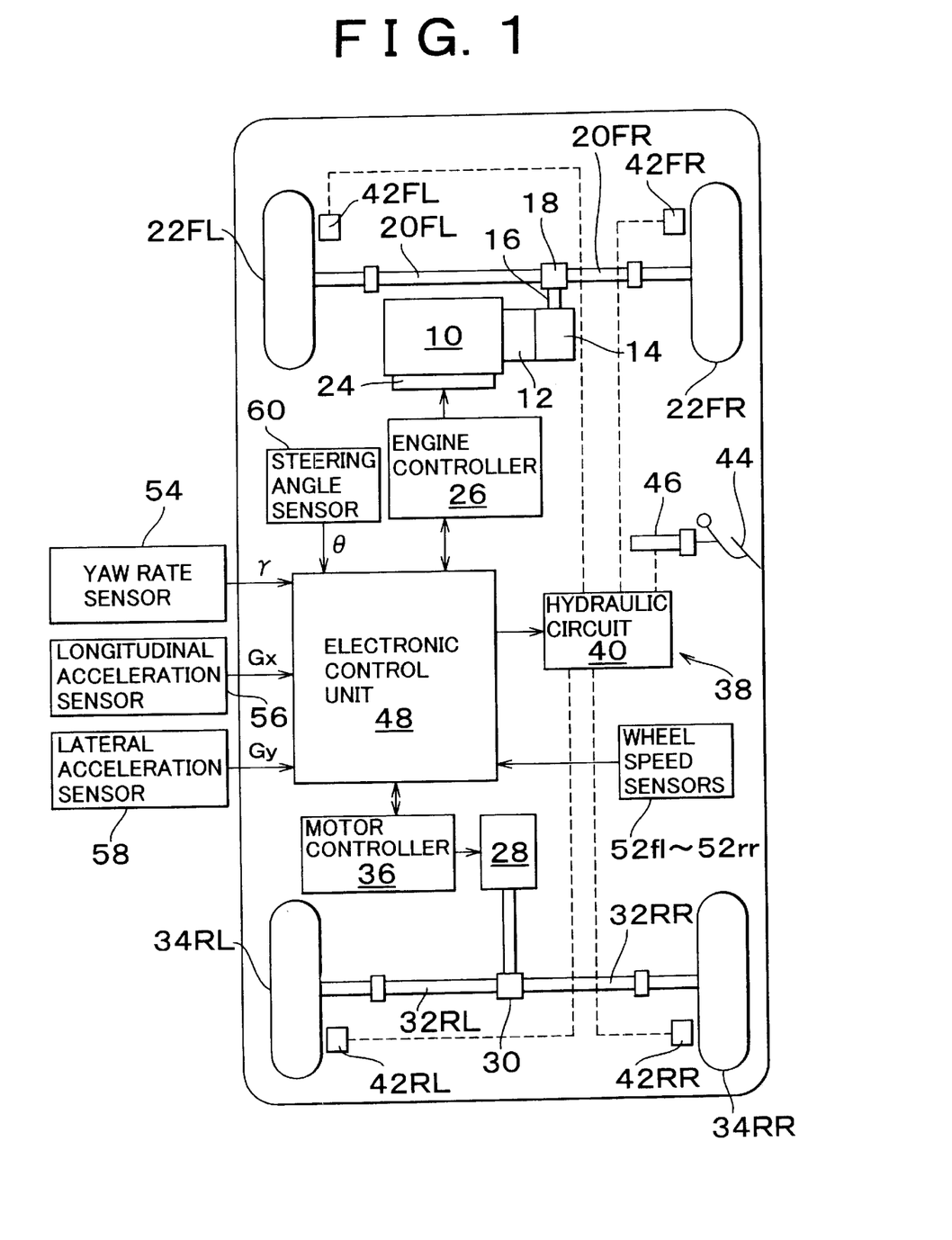
FIG. 1 is a schematic view of a four-wheel-drive automotive vehicle which has a running stability control apparatus of braking force control type, a traction control apparatus and a drive force control system constructed according to one embodiment of the present invention.

Referring first to the schematic view of FIG. 1, a four-wheel-drive automotive vehicle is shown having a vehicle running stability control apparatus of braking force control type, and a drive force control system constructed according to one embodiment of the present invention.

The four-wheel-drive automotive vehicle shown in FIG. 1 has an engine 10 which serves as a primary drive device in the form of a front-wheel drive device. A drive force produced by the engine 10 is transmitted to an output shaft 16 through a torque converter 12 and a transmission 14. From the output shaft 16, the drive force is transmitted to a front left drive axle 20FL and a front right drive axle 20FR through a front differential 18. Thus, the drive force produced by the engine 10 is transmitted to front left and right wheels 22FL, 22FR serving as primary drive wheels, so that the front wheels 22FL, 22FR are driven.

The engine 10 is provided with an air intake device 24 which includes a main throttle valve and an auxiliary throttle valve. The angle of opening of the main throttle valve is controlled according to an amount of operation of an accelerator pedal (not shown) by the vehicle operator. The angle of opening of the auxiliary throttle valve is controlled by an engine controller 26, depending upon the running condition of the vehicle, so that the output of the engine 10 is controlled. The engine controller 26 will be described in detail later.

The automotive vehicle shown in FIG. 1 further has an electric motor 28 which serves as an auxiliary drive device in the form of a rear-wheel drive device. A drive force produced by the electric motor 28 is transmitted to a rear left drive axle 32RL and a rear right drive axle 32RR through a rear differential 30. Thus, the drive force produced by the electric motor 28 is transmitted to rear left and right wheels 34RL, 34RR serving as auxiliary drive wheels, so that the rear wheels 34RL, 34RR are driven. An electric current to be applied to the electric motor is controlled by a motor controller 36, depending upon the running condition of the vehicle, so that the output of the electric motor 28 is controlled. The motor controller 36 will be described in detail later.

The automotive vehicle further has a braking system 38 including a hydraulic circuit 40 and wheel brake cylinders 42FL, 42FR, 42RL, 42RR whose braking pressures are controlled through the hydraulic circuit 40, to brake the front left and right wheels 22FL, 22FR and rear left and right wheels 34RL, 34RR, respectively. The hydraulic-circuit 40 includes a reservoir, an oil pump, and various valve devices, as well known in the art. The braking system 38 further includes a master cylinder 46 operated according to an operating state of a brake pedal 44 operable by the vehicle operator. Normally, the braking pressures to be applied to the wheel brake cylinders 42 are controlled by the vehicle operator through the brake pedal 44. In some specific situations, the braking pressures of the wheel brake cylinders 42 are controlled as needed, by an electronic control unit 48, which will be described in detail.

The electronic control unit 48 incorporates a vehicle running stability control computer, a traction control computer and a drive force control computer. The vehicle running stability control computer is arranged to effect a vehicle running stability control to control the running behavior of the vehicle by controlling the hydraulic circuit 40 to suitably control the braking force to be applied to each wheel 22, 34. The traction control computer is arranged to effect a traction control (TRC control) to control the amount of slip of each wheel 22, 34 being driven by the engine 10, by controlling the hydraulic circuit 40 to suitably control the braking force of each wheel 22, 34. The drive force control computer is arranged to effect a drive force control to control the vehicle drive force by controlling the outputs of the engine 10 and electric motor 28 through the engine controller 26 and motor controller 36.

The electronic control unit 48 is arranged to receive the following: the output signals of wheel speed sensors 52fl, 52fr, 52rl, 52rr, which represent rotating speeds Vwfl, Vwfr, Vwrl, Vwrr of the respective front left and right and rear left and right wheels 22FL, 22FR, 34RL, 34RR; the output signal of a yaw rate sensor 54, which represents a yaw rate γ of the vehicle; the output signal of a longitudinal acceleration sensor 56, which represents a longitudinal acceleration value Gx of the vehicle; the output signal of a lateral acceleration sensor 58, which represents a lateral acceleration value Gy of the vehicle; and the output signal of a steering angle sensor 60, which represents a steering angle θ of the vehicle.

The yaw rate γ, lateral acceleration Gy and steering angle θ represented by the output signals of the yaw rate sensor 54, lateral acceleration sensor 58 and steering angle sensor 60 are positive values when those output signals are generated during leftward or counterclockwise turning of the vehicle, and the longitudinal acceleration value Gx represented by the output signal of the longitudinal accelerator sensor 56 is a positive value when this output signal is generated during acceleration of the vehicle. Each of the computers used by the engine controller 26, motor controller 36 and electronic control unit 48 may be a microcomputer incorporating, for example, a central processing (CPU), a read-only memory (ROM), a random-access memory (RAM) and an input-output device.

As described later more specifically, the electronic control unit 48 is arranged to execute the drive force control process illustrated in the flow chart of FIG. 2, i.e., for controlling the front-wheel drive force and the rear-wheel drive force. This process is performed by applying control signals to the engine controller 26 and motor controller 36 so as to suitably control the outputs of the engine 10 and electric motor 28, depending upon the running condition of the vehicle, in particularly, on the basis of results of determinations as to whether the vehicle running stability control is being effected, the traction control (TRC control) is being effected for the front wheels 22FL, 22FR, the vehicle is running on an uphill road surface, and the vehicle is turning at a relatively low speed.

Figure 3:
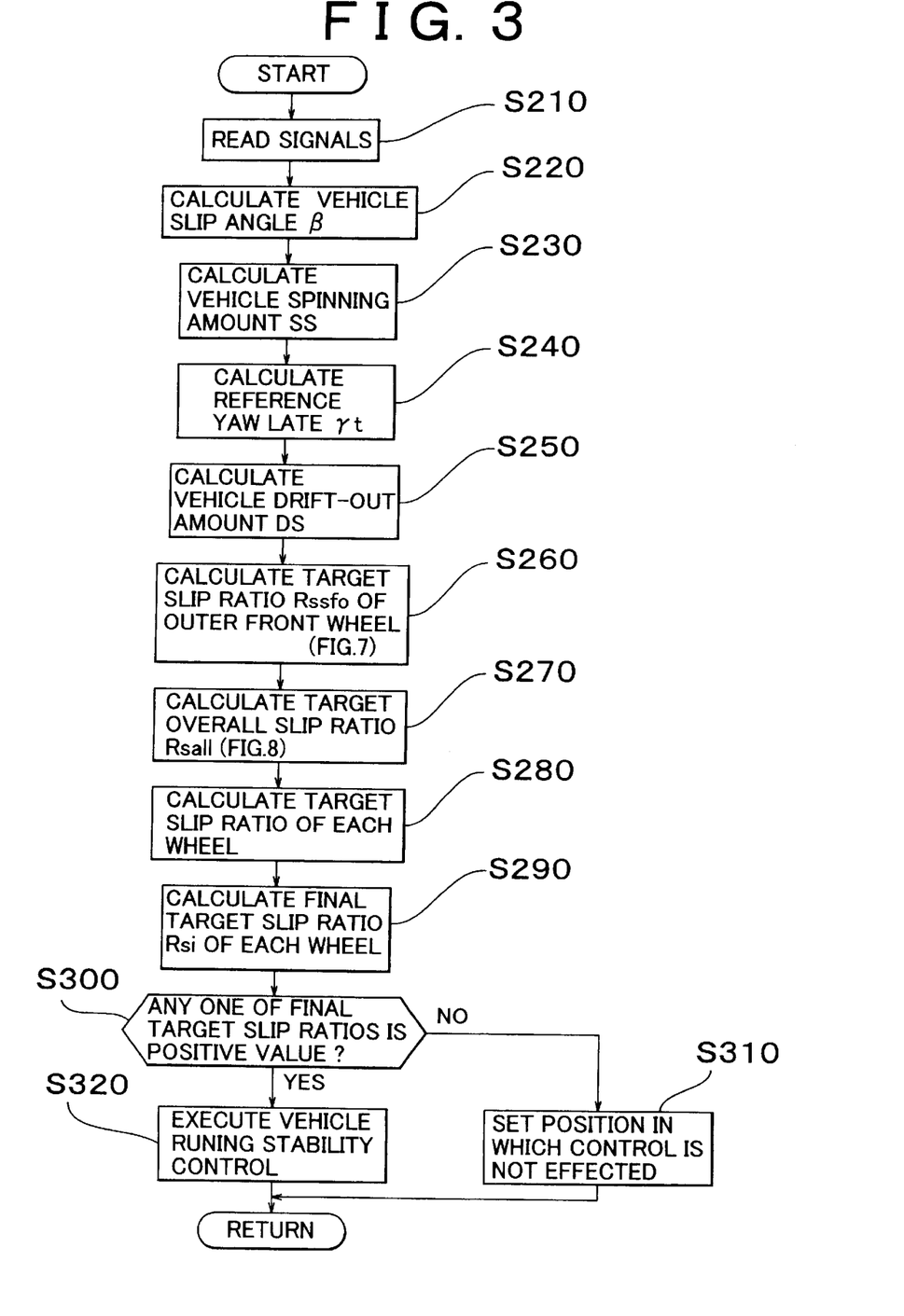
FIG. 3 is a flow chart illustrating a vehicle running stability control process executed by the vehicle running stability control apparatus.

The electronic control unit 48 is further arranged to execute the vehicle running stability control process illustrated in the flow chart of FIG. 3, in which various arithmetic operations are performed on the basis of the parameters detected by the various sensors discussed above. The vehicle running stability control process is formulated to initially determine a turning behavior of the vehicle, and then calculate a target slip ratio of each wheel, (hereinafter referred to as "each braked wheel"), which is braked to increase the turning stability of the vehicle. The calculation of the target slip ratio of each braked wheel is effected on the basis of a reference wheel speed. This reference wheel speed is equal to a lowest one of the rotating speeds of the four wheels 22, 34 while the vehicle is in a spinning or drift-out state during a 4-wheel-drive running with the four wheels 22, 34 driven by the drive forces. During a 2-wheel-drive running with the two wheels driven by the drive forces, the reference wheel speed is equal to a higher one of the rotating speeds of the rear left and right wheels 34RL, 34RR. The vehicle running stability control process is further formulated to control the braking force to be applied to each braked wheel so that the actual slip ratio of the braked wheel coincides with the calculated target slip ratio. The application of the thus controlled braking force to each braked wheel gives the vehicle a yaw moment that causes a reduction of the spinning or drift-out tendency of the vehicle, and decelerates the vehicle, whereby the turning stability of the vehicle is increased.

Figure 4:
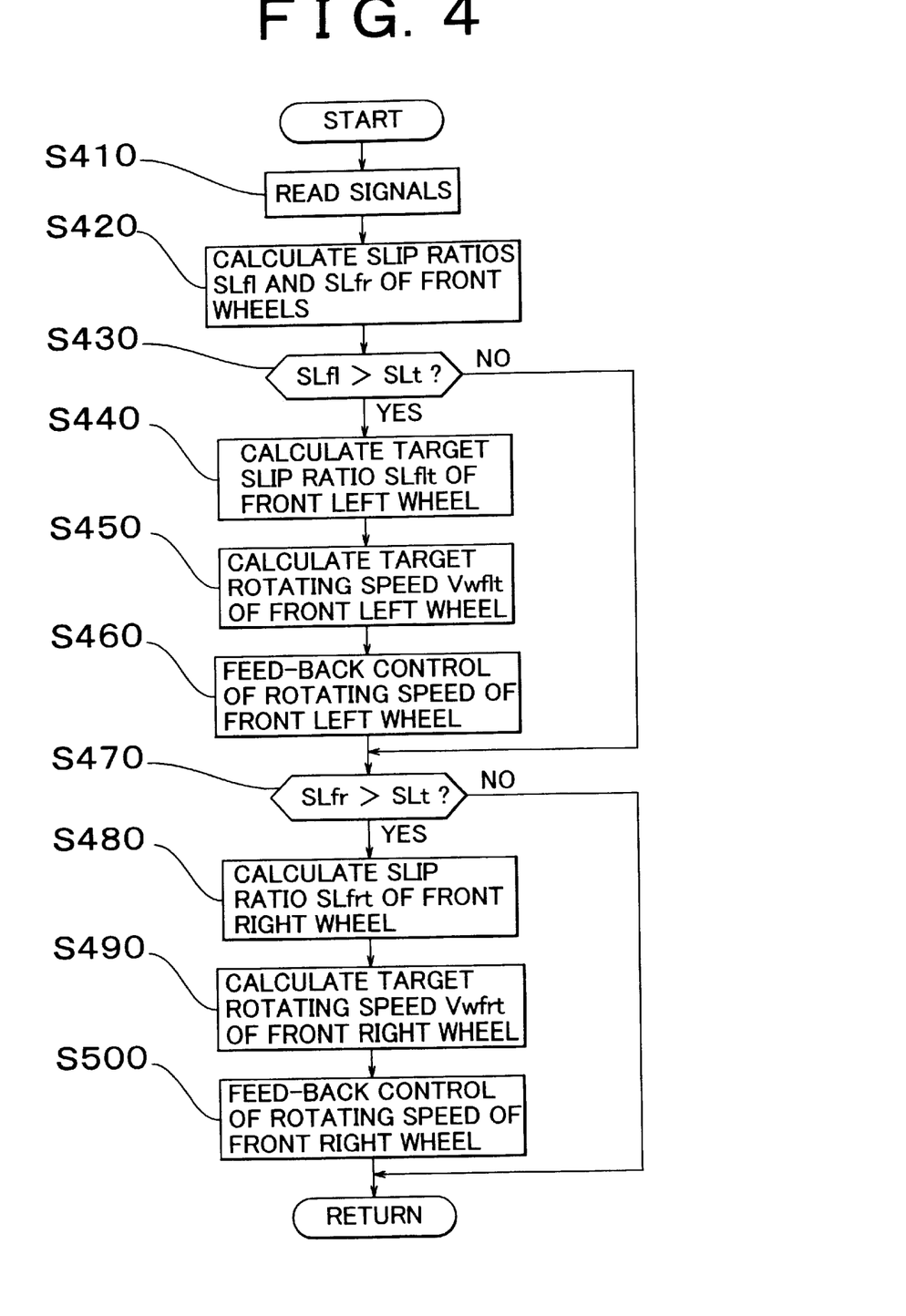
FIG. 4 is a flow chart illustrating a front-wheel traction control process executed by the traction control apparatus.

The electronic control unit 48 is further arranged to execute the traction control process illustrated in the flow chart of FIG. 4, to calculate slip ratios SLfl, SLfr of the front left and right wheels 22FL, 22FR being driven by the engine 10, on the basis of the rotating speeds Vwi (i=fl, fr, rl, rr) of the wheels 22, 34 detected by the respective wheel speed sensors 52fl, 52fr, 52rl, 52rr. When at least one of the slip ratios SLfl, SLfr is excessively high, a suitable braking force is applied to the corresponding wheel, so that the slip ratio SLfl, SLfr is lowered below a predetermined upper limit.

While the vehicle running stability control is not effected, the electronic control unit 48 controls the output of the engine 10 through the engine controller 26 or the output of the electric motor 28 through the motor controller 36, to control the front-wheel drive force for the front wheels 22 or the rear-wheel drive force for the rear wheels 34, depending upon the running condition of the vehicle. This process thereby optimizes the proportion of the front-wheel drive force and the rear-wheel drive force.

The present invention does not require the vehicle running stability control and traction control to be effected by applying the controlled braking force to the appropriate wheel or wheels, i.e., braked wheel or wheels, and does not require the control to optimize the proportion of the front- and rear-wheel drive forces. These controls may be effected in any suitable manners as known in the art.

Referring to the flow chart of FIG. 2, there will be described the drive force control process according to the preferred embodiment of the present invention. This drive force control process is initiated upon activation of an ignition switch provided on the vehicle as well known in the art, and is repeated executed with a predetermined cycle time.

The drive force control process is initiated with step S10 to read in the output signals of the wheel speed sensors 52fl-52rr representative of the rotating speeds Vwi of the respective wheels 22, 34. Then, the control process goes to step S20 to determine whether the vehicle running stability control (described below in detail) is being effected by the vehicle running stability control computer. If a negative decision (NO) is obtained in step S20, the control process goes to step S50. If an affirmative decision (YES) is obtained in step S20, the control process goes to step S30.

Figure 5:
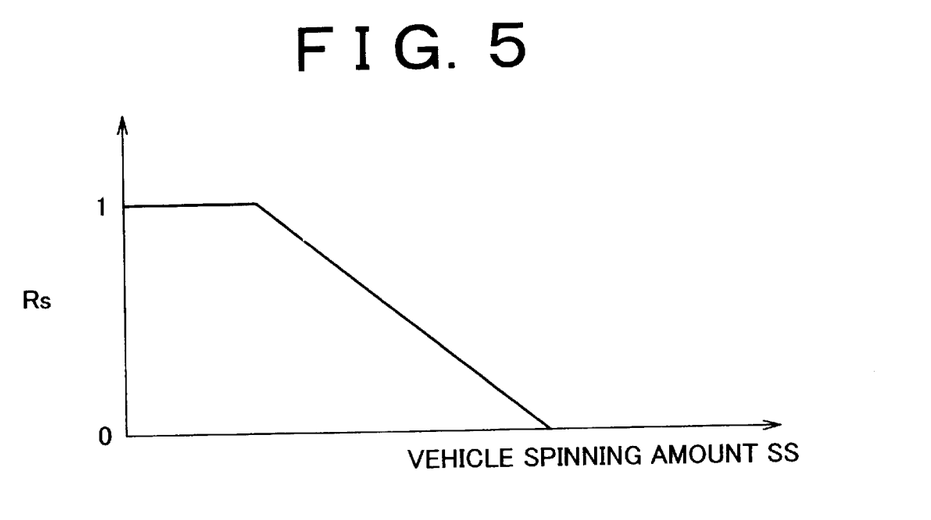
FIG. 5 is a graph showing a relationship between vehicle spinning amount SS and reduction ratio RTs of front-wheel drive torque of the vehicle.
Figure 6:
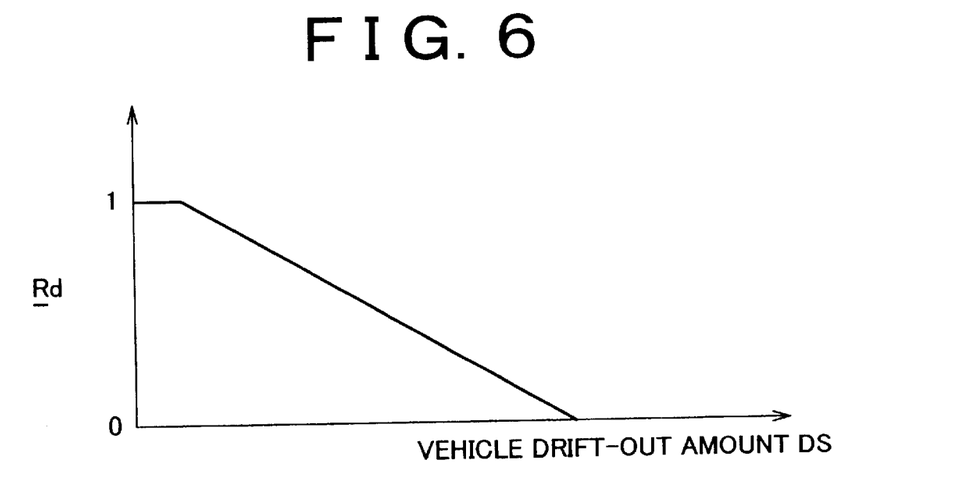
FIG. 6 is a graph showing a relationship between vehicle drift-out amount DS and reduction ratio RTd of the front-wheel drive torque of the vehicle.

Step S30 is provided to calculate a reduction ratio RTs of the drive torque of the front wheels 22, on the basis of a vehicle spinning amount SS (calculated in the vehicle running stability control described below), and according to a stored data map representative of a predetermined relationship between the vehicle spinning amount SS and the reduction ratio RTs of the front-wheel drive torque. An example of the relationship is indicated in the graph of FIG. 5. In step S30, a reduction ratio RTd of the front-wheel drive torque is calculated on the basis of a vehicle drift-out amount DS, and according to a stored data map representative of a predetermined relationship between the drift-out amount DS and the reduction ratio RTd. An example of this relationship is indicated in the graph of FIG. 6. A lower one of the reduction ratios RTs, RTd is determined as a VSC front-wheel torque reduction ratio RTvsc.

Next, in step S40, a target drive torque Tpf for the front wheels 22 is calculated according to the following equation (1) which includes a maximum front-wheel drive torque TPf max (positive constant value) that can be produced by the engine 10:

$$TPf = Tpf\,max \times RTvsc \quad (1)$$

Further, a target drive torque TPr for the rear wheels 34 is determined to be zero (0). Then, the control flow goes to step S180.

When the negative decision (NO) is obtained in step S20, the control process proceeds to step S50 where the electronic control unit 48 determines whether the traction control (described below in detail) is effected for at least one of the front wheels 22, by the traction control computer. If an affirmative decision (YES) is obtained in step S50, the control process goes to step S70. If a negative decision (NO) is obtained in step S50, the control process goes to step S60 in which the output of the engine 10 or the electric motor 28 is controlled to optimize the proportion of the front-wheel drive torque and the rear-wheel drive torque, depending upon the running condition of the vehicle. In this case, the control process returns to step S10.

Step S70 is provided to calculate a friction coefficient $\mu$ of the road surface. Next in step S80, a determination is made whether the vehicle is running on an uphill road surface. If a negative decision (NO) is obtained in step S80, the control process goes to step S110. If an affirmative decision (YES) is obtained in step S80, the control process goes to step S90.

Next, in step S90, a determination is made whether the affirmative decision was obtained in step S80 in the last cycle of execution of the present control routine. If an affirmative decision (YES) is obtained in step S90, the control process goes to step S150. If a negative decision (NO) is obtained in step S90, the control process goes to step S100 to calculate the target front-wheel drive torque Tpf and target rear-wheel drive torque TPr, according to the following equations (2) and (3), respectively:

$$TPf = \mu \times WF \quad (2)$$

$$TPf = MIN(TPf,\,TPr\,max) \quad (3)$$

In the above equations (2) and (3), "WF" represents a load (positive value) acting on the front wheels 22, and "TPr max" represents a maximum value (positive value) of the rear-wheel drive torque that can be produced by the electric motor 28. Control then proceeds to step S180.

In the above equation (3), "MIN(TPf, TPr max)" means the selection of a smaller value of the torque values TPf and TPhr max. That is, the above equation (3) means that the target rear-wheel drive torque TPr is equal to the smaller one of the torque values TPf and TPr max. The symbol "MIN" in the following equations (5) and (7) has the same meaning as in the above equation (3).

Next, in step S110, a determination is made whether the vehicle is turning at a relatively low speed. If an affirmative decision (YES) is obtained in step S110, the control process goes to step S140. If a negative decision (NO) is obtained in step S110, the control process goes to step S120. The determination in step S110 as to whether the vehicle is turning at a relatively low speed is effected, for instance, by determining whether a vehicle running speed V (speed Vb of the vehicle body) estimated on the basis of the wheel speeds Vwi is not higher than a predetermined threshold while the absolute value of the steering angle $\theta$ of the vehicle is not smaller than a predetermined threshold. The threshold of the steering angle $\theta$ may vary with the vehicle running speed V.

In step S120, a determination is made whether the negative decision (NO) was obtained in step S110 in the last cycle of execution of the present control routine. If an affirmative decision (YES) is obtained in step S120, the control process goes to step S150. If a negative decision (NO) is obtained in step S120, the control process goes to step S130 calculate the target front-wheel drive torque TPf and the target rear-wheel drive torque TPr, according to the following equations (4) and (5), respectively. In the equation (5), "WR" represents a load (positive constant value) acting on the rear wheels 34.

$$TPf = \mu \times WF \quad (4)$$

$$TPr = MIN(TPf,\,\mu \times WR) \quad (5)$$

In step S140, a determination is made whether the affirmative decision (YES) was obtained in step S110 in the last cycle of execution of the present control process. If a negative decision (NO) is obtained in step S140, the control process goes to step S170. If an affirmative decision (YES) is obtained in step S140, the control process goes to step S150.

In step S150, the process calculates the slip ratios SLfl, SLfr of the front wheels 22 being driven by the engine 10, and target slip ratios SLflo, SLfro of the front wheels 22, depending upon the running condition of the vehicle. Moreover, in step S150, the electronic control unit 48 further calculates a difference or control error $\Delta SLfl=(SLfl-SLflo)$ and a difference or control error $\Delta SLfr=(SLfr-SLfro)$, and weights Kfl, Kfr for the respective differences $\Delta SLfl$, $\Delta SLfr$. The weights Kfl, Kfr are calculated on the basis of a larger one of the absolute values of the differences $\Delta SLfl$, $\Delta SLfr$. The process in step S150 controls the output of the engine 10 in a feedback fashion on the basis of the differences $\Delta SLfl$, $\Delta SLfr$, so that a sum of $Kfl \times \Delta SLfl$ and $Kfr \times \Delta SLfr$ is reduced to or below a predetermined value. The weights Kfl and Kfr are calculated so as to increase with an increase in the absolute value of the larger one of the absolute values of the differences $\Delta SLfl$, $\Delta SLfr$.

Next, in step S160, the process calculates the slip ratios SLrl, SLrr of the rear wheels 34 being driven by the electric motor 28, and target slip ratios SLrlo, Slrro of the rear wheels 34, depending upon the running condition of the vehicle. In step S160, the electronic control unit 48 further calculates a difference or control error $\Delta SLrl \times (SLrl-SLrlo)$ and a difference or control error $\Delta SLrr=(SLrr-SLrro)$, and weights Krl, Krr for the respective differences $\Delta SLrl$, $\Delta SLrr$. The weights Krl, Krr are calculated on the basis of a larger one of the absolute values of the differences $\Delta SLrl$, $\Delta SLrr$. The process in step S160 controls the output of the electric motor 28 in a feedback fashion on the basis of the differences $\Delta SLrl$, $\Delta SLrr$, so that a sum of $Krl \times \Delta SLrl$ and $Krr \times \Delta SLrr$ is reduced to or below a predetermined value. The weights Krl and Krr are calculated so as to increase with an increase in the absolute value of the larger one of the absolute values of the differences $\Delta SLrl$, $\Delta SLrr$.

In step S170, the process calculates a reduction ratio RTstr of the drive torque of the rear wheels 34 during turning of the vehicle at the relatively low speed, on the basis of the vehicle steering angle $\theta$ and the friction coefficient $\mu$ of the road surface, and further calculate the target front-wheel drive torque TPf and the target rear-wheel drive torque TPr, according to the following equations (6) and (7), respectively:

$$TPf = \times WF \quad (6)$$

$$TPr = MIN(TPf,\,\mu \times WR \times RTstr) \quad (7)$$

Next, in step S180, the process calculates a target value of the opening angle of the auxiliary throttle valve of the engine

10, on the basis of the target front-wheel drive torque TPf, and control the actual opening angle of the auxiliary throttle valve so as to be equal to the calculated target value, for controlling the output of the engine 10 so that the actual drive torque of the front wheels 22 coincides with the target value TPf. Next, in step S190, the process calculates a target value of an electric current to be applied to the electric motor 28, on the basis of the target rear-wheel drive torque TPr, and control the actual value of the electric current applied to the electric motor 28, for controlling the output of the electric motor so that the actual drive of the rear wheels 34 coincides with the target value TPr. Then, the control process returns to step S10.

Referring to the flow chart of FIG. 3, there will be described the vehicle running stability control process, which is also initiated upon activation of the vehicle ignition switch and is repeatedly executed with a predetermined cycle time.

The vehicle running stability control process of FIG. 3 is initiated with step S210 to read in the output signal of the yaw rate sensor 54 representative of the yaw rate γ of the vehicle. Next, in step S220, the process calculates the speed Vb of the vehicle body on the basis of the wheel speeds Vwi, and calculate a difference or control error (Gy−Vb×γ) between the lateral acceleration value Gy of the vehicle and a product of the vehicle body speed Vb and the yaw rate γ. This difference (Gy−Vb×γ) is a control error of the lateral acceleration value Gy of the vehicle, that is, a lateral slip acceleration value Vyd of the vehicle. A lateral slip speed Vy of the vehicle body is calculated by differentiating the lateral slip acceleration value Vyd. In step S220, a slip angle θ of the vehicle body is calculated as a ratio Vy/Vx of the lateral slip speed Vy to the longitudinal vehicle speed Vx (=vehicle body speed Vb).

Then, the control process proceeds to step S230 to calculate a vehicle spinning value SV as a sum (K1×β+K2×Vyd), wherein "K1" and "K2" are predetermined constants (positive values). Further, the direction of turning of the vehicle is determined on the basis of the sign of the yaw rate γ. That is, the vehicle spinning amount SS is obtained as a positive vehicle spinning value +SV when the vehicle is turning in the left or counterclockwise direction, and as a negative vehicle spinning value −SV when the vehicle is turning in the right or clockwise direction. If the calculated vehicle spinning amount SV is a negative value, the vehicle spinning value SS is zeroed. The vehicle spinning value SV may be obtained as a sum (K1×β+K2×βd), wherein "βd" is a derivative of the vehicle slip angle β.

Then, the control process proceeds to step S240 to calculate a target value γc and a reference value γt of the yaw rate γ according to the following equations (8) and (9), respectively.

$$\gamma c = Vb \times \theta / (1 + Kh \times Vb^2) \times H/Rg \tag{8}$$

$$\gamma t = c/(1 + T \times s) \tag{9}$$

In the above equation (8), "Kh", "H" and "Rg" represent a running stability factor of the vehicle, a wheel base of the vehicle, and a steering gear ratio of the steering device of the vehicle, respectively. In the above equation (9), "T" represents a time constant, while "s" represents the Laplace operator. The target yaw rate γc may be calculated with the lateral acceleration value Gy taken into account, so that the calculated target yaw rate can be used as a dynamic yaw rate.

Next, in step S250, the process calculates a vehicle drift-out value DV according to the following equation (10). Further, the direction of turning of the vehicle is determined on the basis of the sign of the yaw rate γ. That is, the vehicle drift-out amount SS is obtained as a positive value vehicle drift-out value +DV when the vehicle is turning in the left or counterclockwise direction, and as a negative vehicle drift-out value −DV when the vehicle is turning in the right or clockwise direction. If the calculated vehicle drift-out value DV is a negative value, the vehicle drift-out amount DS is zeroed. The vehicle drift-out value DV may be calculated according to the following equation (11):

$$DV = (\gamma t - \gamma) \tag{10}$$

$$DV = H \times (\gamma t - \gamma)/V \tag{11}$$

Figure 7:
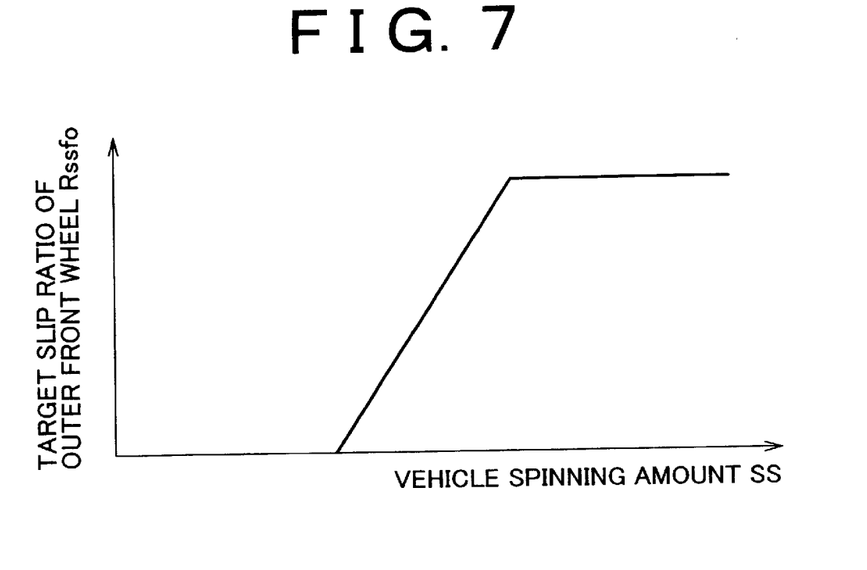
FIG. 7 is a graph showing a relationship between the vehicle spinning amount SS and target slip-ratio value Rssfo of the front wheel located on the outer side of a turning path of the vehicle.
Figure 8:
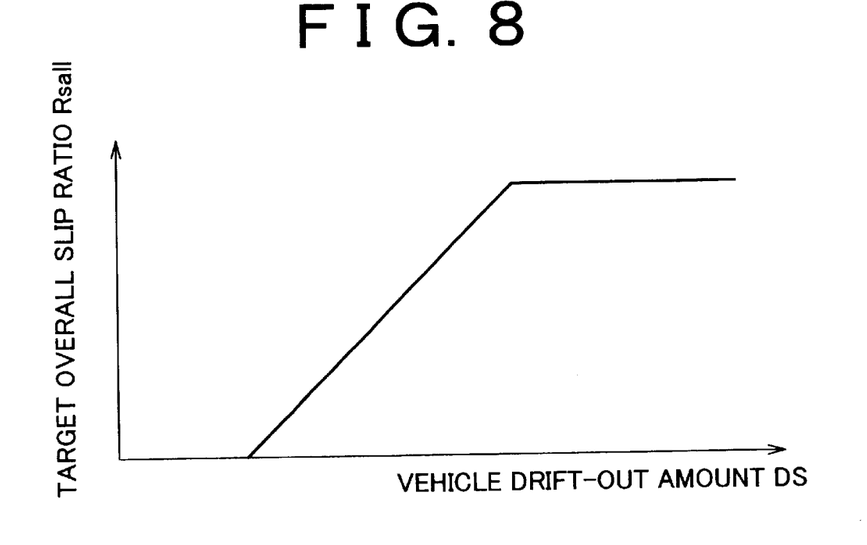
FIG. 8 is a graph showing a relationship between the vehicle drift-out amount DS and target overall slip-ratio value Rsaall of the vehicle.

Next, in step S260, the process calculates a target slip ratio Rssfo of the front wheel 22 located on the outer side of the turning path of the vehicle, on the basis of the vehicle spinning amount SS and according to a stored data map representative of a predetermined relationship between the target slip ratio Rssfo and the vehicle spinning amount SS. An example of this relationship is illustrated in the graph of FIG. 7. Then, in step S270, the process calculates a target overall slip ratio Rsall of the vehicle on the basis of the vehicle drift-out amount DS and according to a stored data map representative of a relationship between the target overall slip ratio Rsall and the vehicle drift-out amount DS. An example of this relationship is illustrated in the graph of FIG. 8.

Then, in step S280, the process calculates target slip ratios Rsfo and Rsfi of the front wheels 22 which are located on the outer and inner sides of the turning path of the vehicle, respectively, and target slip ratios Rsro and Rsri of the rear wheels 34 which are located on the outer and inner sides of the vehicle turning path, respectively. These target slip ratios Rsfo, Rsfi, Rsro and Rsri are calculated according to the following four equations (12), respectively:

$$Rsfo = Rssfo$$

$$Rsfi = Kfi \times Rsall$$

$$Rsro = 0$$

$$Rsri = (1 - Kfi) \times Rsall \tag{12}$$

In the above equations (12), "Kfi" represents a ratio (0.5=Kfi<1) of the slip ratio of the front inner wheel 22 to that of the rear inner wheel 34.

The control process then proceeds to step S290 to determine the front inner and outer wheels 22 which are located on the respective inner and outer sides of the vehicle turning path, and the rear inner and outer wheels 34 which are located on the respective inner and outer sides of the vehicle turning path. This determination is based on the sign of the yaw rate γ. Then, final target slip ratios Rsfr, Rsfl, Rsrr and Rsrl of the front right and left wheels 22FR, 22FL and the rear right and left wheels 34RR, 34RL are calculated, on the basis of the result of determination of the front inner and outer wheels 22 and the rear inner and outer wheels 34. Namely, the final target slip ratios Rsfr, Rsfl, Rsrr and Rsrl of the front and rear right and left wheels 22FR, 22FL, 34RR and 34RL are calculated according to the following equation (13) where the vehicle is turning in the left or counterclockwise direction, and calculated according to the following equation (14) where the vehicle is turning in the right or clockwise direction:

Where the vehicle is turning counterclockwise:

$$Rsfr = Rsfo$$

$$Rsfl = Rsfi$$

$$Rsrr = Rsro$$

$$Rsrl = Rsri \tag{13}$$

Where the vehicle is turning clockwise:

$$Rsfr=Rsfi$$

$$Rsfl=Rsfo$$

$$Rsrr=Rsri$$

$$Rsrl=Rsro \qquad (14)$$

In step S300, the process determines whether any one of the final target slip ratios Rsfr, Rsfl, Rsrr, Rsrl is a positive value (that is, whether all of the ratios Rsfr, Rsfl, Rsrr, Rsrl are not zero). If any one of those ratios is a positive value, that is, if an affirmative decision (YES) is obtained in step S300, the control process goes to step S320. If a negative decision (NO) is obtained in step S300, the control process goes to step S310 in which the valve devices in the hydraulic circuit 40 are placed in their positions in which the vehicle running stability control is not effected. Then, the control process goes back to step S210.

In step S320, implemented where the affirmative decision (YES) is obtained in step S300, the vehicle running stability control is effected to control the braking force to be applied to each wheel 22, 34 such that the actual slip ratio of each wheel 22, 34 coincides with the final target slip ratio Rsfr, Rsfl, Rsrr, Rsrl calculated in step S290. Then, the control process returns to step S210.

A traction control process to effect the traction control for the front wheels 22FL, 22FR will now be described with reference to the flow chart in FIG. 4. The traction control process of FIG. 4 is also initiated upon activation of the ignition switch, and is repeatedly executed with a predetermined cycle time.

The traction control process is initiated in step S410 to read in the output signals of the wheel speed sensors 52fl–52rr, which represent the rotating speeds Vwi of the wheels 22, 34. Then, in step S420, the process calculates the slip ratios SLfl and SLfr of the front left and right wheels 22FL, 22FR being driven by the engine 10, on the basis of the detected wheel speeds Vwi.

Step S430 is then implemented to determine whether the slip ratio SLfl of the front left wheel 22FL is higher than a threshold value SLt (a positive constant). If a negative decision (NO) is obtained in step S430, the control process goes to step S470. If an affirmative decision (YES) is obtained in step S430, the control process goes to step S440 to calculate a target slip ratio SLflt of the front left wheel 22FL, according to the running condition of the vehicle.

The control process then goes to step S450 to calculate a target rotating speed Vwflt of the front left wheel 22FL, on the basis of the calculated target slip ratio SLflt, and then process to step S460 to feed-back control the braking force to be applied to the front left wheel 22FL such that the actual rotating speed Vwfl of the front left wheel coincides with the calculated target value Vwflt. Accordingly, the actual slip ratio Vwfl of the front left wheel 22FL being driven by the engine 10 is lowered.

In step S470, the process determines whether the slip ratio SLfr of the front right wheel 22FRL is higher than a threshold value SLt. If a negative decision (NO) is obtained in step S470, the control process goes back to step S410. If an affirmative decision (YES) is obtained in step S470, the control process goes to step S480 to calculate a target slip ratio SLfrt of the front right wheel 22FR, according to the running condition of the vehicle.

Next, in step S490, the process calculates a target rotating speed Vwfrt of the front right wheel 22FRL, on the basis of the calculated target slip ratio SLfrt, and then goes to step S500 to feed-back control the braking force to be applied to the front right wheel 22FR such that the actual rotating speed Vwfr of the front right wheel coincides with the calculated target value Vwfrt. Accordingly, the actual slip ratio Vwfr of the front right wheel 22FRL being driven by the engine 10 is lowered.

As described above, the electronic control unit 48 according to the present embodiment is arranged to control the vehicle running stability control, upon detection of unstable turning of the vehicle, so that a controlled braking force is applied to the appropriate wheel or wheels according to the vehicle running stability control routine of FIG. 3, so as to improve the running stability, i.e., turning stability, of the vehicle. The unstable turning of the vehicle is typically represented by an excessive degree of spinning of the vehicle or an excessive degree of drift-out of the vehicle. The excessive spinning of the vehicle arises from excessive lateral slipping of the wheels 22, 34, in particular, of the rear wheels 34, which causes a deviation of the actual turning path of the vehicle from the nominal turning path on the inner side of the nominal turning path.

Figure 2:
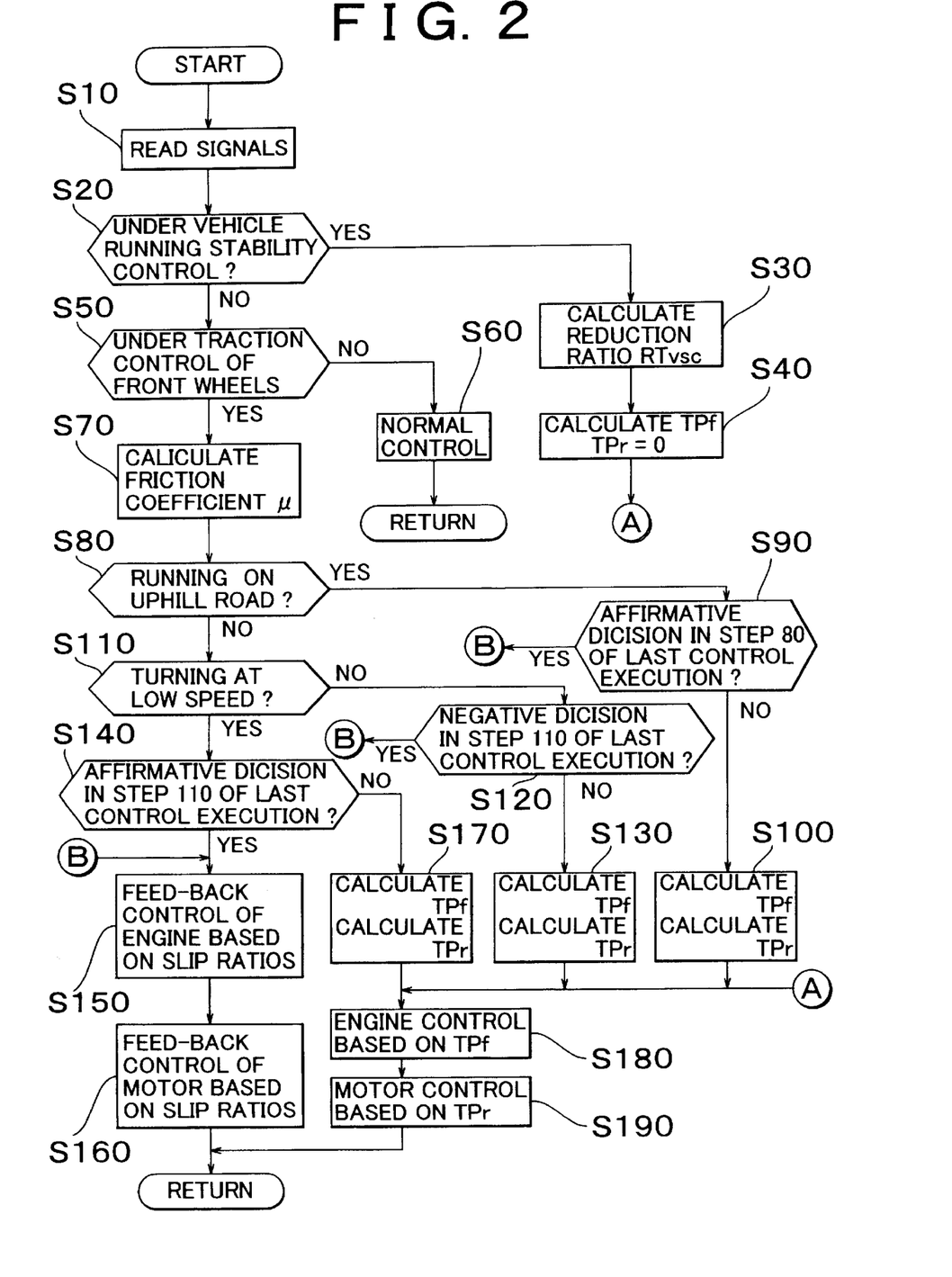
FIG. 2 is a flow chart illustrating a drive force control process executed by the drive force control system.

The nominal turning path is represented by the actual steering angle θ of the vehicle. The excessive drift-out of the vehicle arises from excessive lateral slipping of the front wheels, which causes a deviation of the actual turning path of the vehicle from the nominal turning path on the outer side of the nominal turning path, that is, causes actual turning of the vehicle along a turning radius larger than the radius of the nominal turning path.

Where the vehicle running stability control is effected, the affirmative decision (YES) is obtained in step S20 of the drive force control routine of FIG. 2, and the control process goes to step S30 to calculate the reduction ratio RTvsc of the front-wheel drive torque on the basis of the vehicle spinning amount SS or drift-out amount DS. Then, in step S40, the process calculates the target front-wheel drive torque TPf according to the above equation (1), and zero the target rear-wheel drive torque TPr. Then, the control process proceeds to step S180 to control the output of the engine 10 such that the actual drive torque of the front wheels 22 coincides with the target value TPf. Next, in step S190, the process controls the output of the electric motor 28 such that the actual drive torque of the rear wheels 34 coincides with the target value TPr. After the vehicle running stability control is terminated, steps S150 and S160 are repeatedly implemented to control the outputs of the engine 10 and electric motor 28 in the feedback fashion such that the differences or control errors ΔSLf and ΔSLr of the slip ratios SLf, SLr of the front and rear wheels 22, 34 driven by the engine 10 and electric motor 28 are reduced to or below the predetermined values.

Thus, the drive torque of the front wheels 22 is reduced with an increase in the instability of the running behavior of the vehicle, while the drive torque of the rear wheels 34 is held zero, so that the vehicle can be effectively decelerated. Further, the drive forces of the front and rear wheels are controlled so as to increase a difference between the braking forces applied to the front left and right wheels 22FL, 22FR, when the vehicle is in a spinning state, so that the vehicle in the spinning state is given a suitable moment in a direction opposite to the direction of the spinning moment. When the vehicle is in a drift-out state, suitable braking forces are applied to the front and rear wheels which are located on the inner side of the turning path of the vehicle. The drive force control arrangement according to the present embodiment of this invention described above makes it possible to more effectively and more steadily increase the running or turning stability of the vehicle, than where the drive force control is not effected at all, or than the conventional drive force control arrangement for controlling the proportion of front-wheel and rear-wheel drive forces of a four-wheel-drive vehicle.

Where at least one of the front left and right wheels 22 being driven by the engine 10 has an excessively high slip ratio while the vehicle is running with a relatively high degree of stability without a considerable spinning or drift-out phenomenon, the negative decision (NO) is obtained in step S20 of the drive force control process of FIG. 2, while the affirmative decision (YES) is obtained in step S50 of the same process. If the vehicle is not running on an uphill road surface and is not turning at a relatively low speed, that is, if the negative decision (NO) is obtained in steps S80 and S110, the control process proceeds to step S130 to calculate the target front-wheel drive torque TPf and the target rear-wheel drive torque TPr according to the respective equations (4) and (5) given above, and then goes to steps S180 and S190 in which the outputs of the engine 10 and electric motor 28 are controlled such that the actual drive torques of the front and rear wheels 22, 34 coincide with the respective target values TPf, TPr. After the front-wheel traction control is terminated, steps S150 and S160 are repeatedly implemented to control the outputs of the engine 10 and electric motor 28 in the feedback fashion such that the differences or control errors ΔSLF and ΔSLr of the slip ratios SLf, SLr of the front and rear wheels 22, 34 driven by the engine 10 and electric motor 28 are reduced to or below the predetermined values.

Thus, the drive torques of the front and rear wheels 22, 34 are controlled so as to be maximized depending upon the friction coefficient $\mu$ of the road surface, with the rear-wheel drive torque being held not larger than that of the front-wheel drive torque, so that the vehicle can be started or accelerated with high drivability while preventing deterioration of the running stability, even where the traction control is effected for at least one of the front wheels during stable running of the vehicle on a non-uphill road surface without turning at a relatively low speed.

Where the traction control is effected for at least one of the front wheels 22 during running of the vehicle on an uphill road surface, the negative decision (NO) is obtained in step S20, while the affirmative decision (YES) is obtained in steps S50 and S80. In this case, the control process goes to step S100 to calculate the target drive torques TPf, TPr of the front and rear wheels being respectively driven by the engine 10 and the electric motor 28, according to the respective equations (2) and (3) indicated above. Then, in steps S180 and S190, the process controls the outputs of the engine 10 and electric motor 28 such that the actual drive torques of the front and rear wheels 22, 34 coincide with the respective target values TPf, TPr. After the front-wheel traction control is terminated, steps S150 and S160 are repeatedly implemented to control the outputs of the engine 10 and electric motor 28 in the feedback fashion on the basis of the differences or control errors ΔSLf and ΔSLr of the slip ratios SLf, SLr of the front and rear wheels 22, 34.

Thus, the drive torque of the front wheels 22 is controlled to the target value TPf depending upon the friction coefficient $\mu$ of the road surface, with the rear-wheel drive torque being maximized but held not larger than that of the front-wheel drive torque, so that the vehicle can be driven on an uphill road surface with high drivability while preventing deterioration of the running stability, even where the traction control is effected for at least one of the front wheels during stable running of the vehicle on the uphill road surface.

Where the traction control is effected for at least one of the front wheels 22 during stable turning of the vehicle at a relatively low speed, the negative decision (NO) is obtained in step S20, and the affirmative decision (YES) is obtained in step S50 while the negative decision (NO) is obtained in step S80. In this case, the control process goes to step S170 to calculate the target drive torques TPf, TPr of the front and rear wheels being respectively driven by the engine 10 and the electric motor 28, according to the respective equations (6) and (7) indicated above. Steps S180 and S190 are then implemented to control the outputs of the engine 10 and electric motor 28 such that the actual drive torques of the front and rear wheels 22, 34 coincide with the respective target values TPf, TPr. In this case, the rear-wheel target drive torque TPr is determined such that the target drive torque TPr decreases with an increase in the turning angle of the vehicle and with a decrease in the friction coefficient $\mu$ of the road surface, so that the output of the electric motor 28 is reduced according to the vehicle turning angle and the friction coefficient $\mu$. After the front-wheel traction control is terminated, steps S150 and S160 are repeatedly implemented to control the outputs of the engine 10 and electric motor 28 in the feedback fashion such that the differences or control errors ΔSLf and ΔSLr of the slip ratios SLf, SLr of the front and rear wheels 22, 34 are reduced to or below the predetermined values.

Thus, the drive torque of the front wheels 22 is controlled to the target value TPf depending upon the friction coefficient $\mu$ of the road surface, while the rear-wheel drive torque is optimized depending upon the road surface friction coefficient and the vehicle turning angle, but is held not larger than that of the front-wheel drive torque, so that the deterioration of the turning stability of the vehicle can be effectively prevented. This process can occur even where the traction control is effected for at least one of the front wheels during stable turning of the vehicle at the relatively low speed. In particular, the control arrangement indicated above is effective to prevent the deterioration of the turning stability of the vehicle due to an excessively large drive force of the rear wheels 34.

Where the vehicle is running with high stability without the front-wheel traction control, the negative decision (NO) is obtained in steps S20 and S50, and the control process goes to step S60 in which the drive forces of the front and rear wheels are controlled in the normal manner, that is, the outputs of the engine 10 and electric motor 28 are controlled so as to optimize the proportion of the front-wheel and rear-wheel drive forces according to the running condition of the vehicle, so that the vehicle can be driven by the four wheels with the optimum proportion of the front- and rear-wheel drive forces.

In the vehicle running stability control according to the vehicle running stability control process of FIG. 3 described above, the braking force is applied to the front wheel located on the outer side of the turning path of the vehicle while the vehicle is in a spinning state, and to the front and rear wheels located on the inner side of the vehicle turning path while the vehicle is in a drift-out state. However, the vehicle running stability control may be effected such that the braking force is applied to the front and rear wheels located on the outer side of the vehicle turning path while the vehicle is in the spinning state, and to only the rear wheel located on the inner side of the vehicle turning path or to the three wheels other than the wheel located on the rear wheel located on the outer side of the vehicle turning path while the vehicle is in the drift-out state.

In the drive force control of FIG. 2 according to the illustrated embodiment, the drive torque of the rear wheels 34 is zeroed where the vehicle running stability control is effected. However, the drive torque of the rear wheels nee not be zeroed and may be reduced to a value larger than zero, irrespective of the amount of reduction of the drive torque of the front wheels.

While the illustrated embodiment is applied to a four-wheel-drive vehicle using the engine 10 as the front-wheel drive device and the electric motor 28 as the rear-wheel drive device, the principle of the present invention is equally applicable to any automotive vehicle using any drive device or devices known in the art. For instance, the present invention is applicable to an automotive vehicle using a hybrid drive device consisting of an internal combustion engine and an electric motor for the front wheels, that is, the hybrid drive device may serve as a primary drive device. Two separate drive devices may be applied to the rear left and right wheels respectively.

Although the illustrated embodiment is applied to the vehicle drive system including the primary drive device for the front wheels and the auxiliary drive device for the rear wheels, the principle of the present invention is equally applicable to a vehicle drive system including the primary drive device for the rear wheels and the auxiliary drive device for the front wheels. In this case, the front-wheel and rear-wheel drive devices are controlled in the manners opposite to those in the illustrated embodiment, that is, controlled in the same manners as applied to the electric motor 28 and the engine 10, respectively, in the illustrated embodiment.

In the illustrated embodiments, the controller is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A drive force control system for a vehicle, comprising:
   a front-wheel drive device that drives front wheels of the vehicle;
   a rear-wheel drive device that drives rear wheels of the vehicle, one of said front-wheel and rear-wheel drive devices serving as a primary drive device of the vehicle while the other of said front-wheel and rear-wheel drive devices serving as an auxiliary drive device of the vehicle; and
   a drive-force controller that reduces a drive force produced by said primary drive device when an amount of lateral slip of the wheels is larger than a predetermined threshold and reduces a drive force produced by said auxiliary drive device by an amount irrespective of an amount of reduction of the drive force of said primary drive device.

2. The drive force control system according to claim 1, wherein said drive-force controller reduces the drive force of said auxiliary drive device to zero when the amount of lateral slip of the wheels is larger than said predetermined threshold.

3. The drive force control system according to claim 1, wherein said front-wheel drive device serves as said primary drive device while said rear-wheel drive device serves as said auxiliary drive device.

4. The drive force control system according to claim 1, wherein said drive-force controller is further operable to apply a braking force to a selected at least one of the wheels, so as to effect a vehicle running stability control to improve running stability of the vehicle, when the amount of lateral slip of the wheels is larger than said predetermined threshold, said drive-force controller being further operated during said vehicle running stability control, to reduce the drive force of said primary drive device, and reduce the drive force of said auxiliary drive device by the amount irrespective of the amount of reduction of the drive force of said primary drive device.

5. The drive force control system according to claim 4, wherein said drive-force controller increases the amount of reduction of the drive force of said primary drive device with an increase in the amount of lateral slip of the wheels.

6. The drive force control system according to claim 1, further comprising a sensor that detects the amount of lateral slip of the wheels, and wherein said drive-force controller calculates a drift-out amount or a spinning amount of the vehicle on the basis of the detected amount of lateral slip of the wheels, and determines the amount of reduction of the drive force of said primary drive device on the basis of the calculated drift-out amount or spinning amount.

7. The drive force control system according to claim 1, wherein said primary drive device in a power train including at least an engine, while said auxiliary drive device includes an electric motor.

8. A drive force control system for a vehicle, comprising:
   a front-wheel drive device that drives front wheels of the vehicle;
   a rear-wheel drive device that drives rear wheels of the vehicle; and
   a drive-force controller that reduces a drive force produced by said front-wheel drive device depending upon a slipping state of said front wheels being driven by said front-wheel drive device, and reduces a drive force produced by said rear-wheel drive device depending upon an angle of turning of the vehicle.

9. The drive force control system according to claim 8, wherein said drive-force controller increases an amount of reduction of the drive force of said rear-wheel drive device with an increase in said angle of turning of the vehicle.

10. The drive force control system according to claim 9, wherein said drive-force controller increases an amount of reduction of the drive force of said rear-wheel drive device with a decrease in a friction coefficient of a road surface on which the vehicle is running.

11. The drive force control system according to claim 10, wherein said drive-force controller reduces the drive force of said rear-wheel drive device depending upon said angle of turning of the vehicle, when a running speed of the vehicle is not higher than a predetermined reference value.

12. The drive force control system according to claim 9, further comprising a sensor that detects a steering angle of the vehicle, and wherein said drive-force controller obtains said angle of turning of the vehicle on the basis of the detected steering angle.

13. A method of controlling a drive force of a vehicle, including a front-wheel drive device for driving front wheels of the vehicle, and a rear-wheel drive device for driving rear wheels of the vehicle, one of said front-wheel and rear-wheel drive devices serving as a primary drive device of the vehicle, while the other of said front-wheel and rear-wheel drive devices serving as an auxiliary drive device of the vehicle, the method comprising the steps of:

detecting an amount of lateral slip of the wheels; and reducing a drive force produced by said primary drive device when the amount of lateral slip of the wheels is larger than a predetermined threshold, and reducing a drive force produced by said auxiliary drive device by an amount irrespective of an amount of reduction of the drive force of said primary drive device when said amount of lateral slip is larger than said predetermined threshold.

14. The method according to claim 13, wherein said step of reducing a drive force produced by said auxiliary drive device reduces the drive force of said auxiliary drive force to zero when the amount of lateral slip of the wheel is larger than said predetermined threshold.

15. A method of controlling a drive force of a vehicle, including a front-wheel drive device for driving front wheels of the vehicle, and a rear-wheel drive device for driving rear wheels of the vehicle, the method comprising the steps of:

reducing a drive force produced by said front-wheel drive device depending upon a slipping state of said front wheels being driven by said front-wheel drive device; and reducing a drive force produced by said rear-wheel drive device depending upon an angle of turning of the vehicle.

* * * * *